United States Patent

Braunstein

[15] 3,697,624

[45] Oct. 10, 1972

[54] DIISOCYANATE COUPLING OF OXYMETHYLENE POLYMER AND POLYBUTYLENE TEREPHTHALATE

[72] Inventor: David M. Braunstein, Edison, N.J.

[73] Assignee: Celanese Corporation, New York, N.Y.

[22] Filed: Oct. 14, 1970

[21] Appl. No.: 80,816

[52] U.S. Cl. ............260/860, 260/67 R, 260/67 TN
[51] Int. Cl. .............................................C08g 39/10
[58] Field of Search......................................260/860

[56] References Cited

UNITED STATES PATENTS 3,364,157   1/1968   Halek et al. ...............260/860
3,376,361   4/1968   Halek et al. ...............260/860
3,565,863   2/1971   Schmelzer et al. .....260/67 TN Primary Examiner—William H. Short
Assistant Examiner—Edward Woodberry
Attorney—Thomas J. Morgan, Linn I. Grim and Arnold Grant

[57] ABSTRACT

Disclosed herein is a modified oxymethylene polymer having an improved balance of physical properties such as tensile strength, tensile modulus, flexural strength and impact strength. The modified oxymethylene polymer is prepared by the coupling reaction of an oxymethylene polymer and polybutylene terephthalate with an isocyanate or isothiocyanate.

16 Claims, No Drawings

DIISOCYANATE COUPLING OF OXYMETHYLENE POLYMER AND POLYBUTYLENE TEREPHTHALATE

The present invention relates to a modified oxymethylene polymer having an improved balance of physical properties such as tensile strength, tensile modulus, flexural strength and impact strength. The modified oxymethylene polymer is prepared by the coupling reaction of an oxymethylene polymer and polybutylene terephthalate with an isocyanate or isothiocyanate.

Oxymethylene polymers are distinguished by a number of excellent properties so that they are suitable for a variety of industrial applications.

For some applications, however, molecular modification of oxymethylene polymers is desirable to provide polymers of modified physical property characteristics.

U.S. Pat. No. 3,364,157 issued on Jan. 16, 1968 to G. W. Halek et al. discloses modified oxymethylene polymers comprising an oxymethylene polymer coupled to a dissimilar organic polymer having a terminal or pendant group containing active or acidic hydrogen with an isocyanate or isothiocyanate.

According to said U.S. Pat. No. 3,364,157, the presence of acidic hydrogen may be determined by the Zerewitnoff method, utilizing the reaction of such active, or acidic hydrogen compounds with Grignard reagents, liberating RH corresponding to RMgX. Thus, when a compound containing acidic hydrogen is reacted with methyl magnesium iodide, methane is liberated, giving a positive test. The amount of liberated methane may be collected and measured, and the number of active hydrogen atoms per mole determined, where the molecular weight is known. A further description of the Zerewitnoff test including modifications of the procedure for various applications, can be found in Grignard Reactions of Non-Metallic Substances, Kharasch, M.S., and Reinmuth, O. (Prentice-Hall, Inc., New York, 1954), pp. 1166–1174.

Further, according to said U.S. Pat. No. 3,364,157, dissimilar organic polymers containing active or acidic hydrogen suitable for coupling to oxymethylene polymers with an isocyanate or isothiocyanate to produce modified oxymethylene polymers are polyethers, polyacetals, cellulose and its derivatives, polycarbonates, polyamides, mercapto containing polymers, polyurethanes, and polyesters such as polyethylene terephthalate, poly (1,4-cyclohexanedicarbinyl terephthalate), polytetramethylene sebacate and the polyalkylene glycol adipates.

The present invention is based on the discovery that a modified oxymethylene polymer prepared by the coupling reaction of an oxymethylene polymer and polybutylene terephthalate with an isocyanate or isothiocyanate, exhibits a remarkable balance of physical properties such as tensile strength, tensile modulus, flexural strength and impact strength which makes it extremely desirable for use as an engineering plastic material.

This balance of physical properties such as tensile strength, tensile modulus, flexural strength and impact strength of the modified oxymethylene polymer of the instant invention is remarkable as compared to corresponding physical properties of modified oxymethylene polymers prepared from lower homologue esters of terephthalic acid such as polyethylene terephthalate and polypropylene terephthalate, in which an increase in tensile strength, tensile modulus and flexural strength of the oxymethylene polymer is accompanied by a drastic reduction of impact strength.

THE OXYMETHYLENE POLYMER

Oxymethylene polymers having recurring —$CH_2O$— units, have been known for many years. They may be prepared by the polymerization of anhydrous formaldehyde or by the polymerization of trioxane, which is a cyclic trimer of formaldehyde.

High-molecular-weight oxymethylene polymers have been prepared by polymerizing trioxane in the presence of certain fluoride catalysts. They may also be prepared in high yields and at rapid reaction rates by the use of catalysts, comprising boron fluoride coordination complexes with organic compounds, as described in U.S. Pat. No. 2,989,506 of Donald E. Hudgin and Frank M. Berardinelli.

Other methods of preparing oxymethylene polymers are disclosed by Kern et al. in Angewandte Chemie, 73 (6), 177–186 (Mar. 21, 1961), and in Sittig, "Polyacetals: What You Should Know," Petroleum Refiner, 41, 11, 131–170 (Nov. 1962), including polymers containing repeating carbon-to-carbon single bonds in the polymer chain and which are made by copolymerizing trioxane with cyclic ethers, e.g., dioxane, lactones, e.g., betapropiolactone, anhydrides, e.g., cyclic adipic anhydride, and ethylenically unsaturated compounds, e.g., styrene, vinyl acetate, vinyl methyl ketone, acrolein, etc.

Still other oxymethylene polymers, more particularly copolymers, which are adapted for use in producing the improved oxymethylene polymers according to this invention are those which are prepared as described in U.S. Pat. No. 3,027,352 of Walling et al. by copolymerizing, for example, trioxane with any various cyclic ethers having at least two adjacent carbon atoms, e.g., ethylene oxide, dioxolane, and the like.

Thus, the oxymethylene copolymer used in carrying this invention into effect may be a polymer having a structure comprising recurring units represented by the general formula (I) 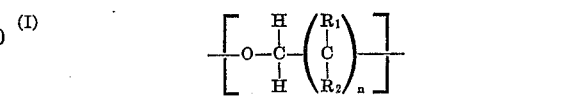

wherein each $R_1$ and $R_2$ is selected from the group consisting of hydrogen, lower alkyl and halogen-substituted lower alkyl radicals, and wherein $n$ is an integer from zero to three, inclusive, and n being zero in from 85 to 99.9 mole percent of the recurring units. Each lower alkyl radical preferably has from one to two carbon atoms, inclusive. The oxymethylene copolymer may be defined more specifically as a normally solid, substantially water-insoluble copolymer, the repeating units of which consist essentially of (A) —$OCH_2$— groups interspersed with (B) groups represented by the general formula (II) 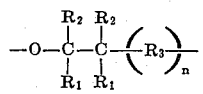

wherein each $R_1$ and $R_2$ is selected from the group consisting of hydrogen, lower alkyl and halogen-substituted lower alkyl radicals, each $R_3$ is selected from the group consisting of methylene, oxymethylene, lower alkyl and haloalkyl-substituted methylene, and lower alkyl and haloalkyl-substituted radicals, and $n$ is an integer from zero to three inclusive.

Each lower alkyl radical preferably has from one to two carbon atoms, inclusive. The $-OCH_2-$ units of (A) constitute from 85 to 99.9 mole percent of the recurring units. The units of (B) are incorporated into the copolymer during the step of copolymerization to produce the copolymer by the opening of the ring of a cyclic ether having adjacent carbon atoms by the breaking of an oxygen-to-carbon linkage.

Polymers of the desired structure may be prepared by polymerizing trioxane together with from about 0.1 to about 15 mole percent of a cyclic ether having at least two adjacent carbon atoms, preferably in the presence of a catalyst comprising a boron fluoride coordinate complex in which oxygen or sulfur is the donor atom.

In general, the cyclic ethers employed in making the oxymethylene copolymer are those represented by the general formula (III) 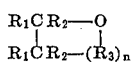

wherein each $R_1$ and $R_2$ is selected from the group consisting of hydrogen, lower alkyl and halogen-substituted lower alkyl radicals, and each $R_3$ is selected from the group consisting of methylene, oxymethylene, lower alkyl and haloalkyl-substituted methylene and lower alkyl and haloalkyl-substituted oxymethylene radicals, and $n$ is an integer from zero to three inclusive. Each lower alkyl radical preferably has from one to two carbon atoms inclusive.

The preferred cyclic ethers used in the preparation of the oxymethylene copolymers are ethylene oxide and 1,3-dioxolane, which may be represented by the formula (IV) 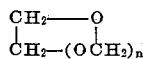

wherein $n$ represents an integer from zero to two, inclusive. Other cyclic ethers that may be employed are 1,3-dioxane, trimethylene oxide, 1,2-propylene oxide, 1,2-butylene oxide, 1,3-butylene oxide and 2,2-di-(chloromethyl)-1,3-propylene oxide.

The preferred catalysts used in preparing the oxymethylene copolymers are the aforementioned boron fluoride coordinate complexes, numerous examples of which are given in the previously identified Walling et al. patent. Reference is made to this patent for further information concerning the polymerization conditions, amount of catalyst employed, etc.

The oxymethylene copolymers produced from the preferred cyclic ethers have a structure composed substantially of oxymethylene and oxyethylene groups in a ratio of from about 6 to 1 to about 1,000 to 1.

The oxymethylene copolymers described briefly above are members of the broader group of such copolymers that are useful in practicing the present invention and which have at least one chain containing recurring oxymethylene units interspersed with $-OR-$ groups in the main polymer chain. In such $-OR-$ groups, R represents a divalent radical containing at least two carbon atoms linked directly to each other and positioned in the polymer chain between the two valences with any substituents on said radical being inert, that is, substituents that are free from interfering functional groups and do not induce undesirable reactions under the conditions involved. Among such copolymers that advantageously may be employed in practicing this invention are oxymethylene copolymers containing from about 60 mole percent to 99.9 mole percent of recurring oxymethylene groups to from 0.1 mole percent to about 40 mole percent of $-OR-$ groups. As indicated hereinbefore, the most preferred copolymers are those having from about 85 mole percent to 99.9 mole percent of recurring oxymethylene groups and from about 0.1 to 15 mole percent of $-OR-$ groups. In a preferred embodiment R may be, for example, an alkylene or substituted alkylene group containing at least two carbon atoms.

Also useful in carrying the instant invention into effect are oxymethylene copolymers having a structure comprising recurring units consisting essentially of those represented by the general formula (V) 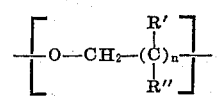

wherein $n$ represents an integer from 0 to 5, inclusive, and representing 0 (zero) in from 60 to 99.6 mole percent of the recurring units; and R' and R'' represent inert substituents, that is, substituents which are free from interfering functional groups and will not induce undesirable reactions. Thus, one advantageously may utilize oxymethylene copolymers having a structure comprising oxymethylene and oxyethylene recurring units wherein from 60 to 99.9 mole percent of the recurring units are oxymethylene units.

It has previously been indicated that especially preferred copolymers employed in practicing the present invention are those containing in their molecular structure oxyalkylene units having adjacent carbon atoms which are derived from cyclic ethers having adjacent carbon atoms. Such copolymers may be prepared by copolymerizing trioxane or formaldehyde with a cyclic ether represented by the general formula (VI) 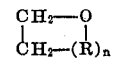

wherein *n* represents an integer from zero to 4, inclusive, and R represents a divalent radical selected from the group consisting of (a) $CH_2$, (B) $CH_2O$, and (C) any combination of $CH_2$ and $CH_2O$.

Examples of specific cyclic ethers that may be used in preparing copolymers of the kind embraced by Formula VI, in addition to the cyclic ethers previously mentioned with reference to the copolymers embraced by Formula IV, and of acetals and cyclic esters that may be employed instead of cyclic ethers, are 1,3,5-trioxepane, 1,3-dioxepane, betapropiolactone, gammabuty-rolactone, neopentyl formal, pentaerythritol diformal, paraldehyde, and butadiene monoxide. In addition, glycols including, for example, ethylene glycol, diethylene glycol, 1,3-butylene glycol, propylene glycol and the like may be employed instead of the cyclic ethers, acetals and esters just mentioned.

Although formaldehyde is a desirable source of the oxymethylene moiety (i.e., $R_2O$ wherein $R_2$ represents methylene or substituted methylene), it will be understood, of course, by those skilled in the art that instead of formaldehyde, other sources of the oxymethylene moiety may be used; e.g., paraformaldehyde, trioxane, acetaldehyde, propionaldehyde, and the like. One may also employ cyclic acetals, e.g., 1,3,5-trioxepane, in lieu of both the cyclic ether and formaldehyde.

As used in the specification and claims, the term "oxymethylene polymers" denotes homopolymers and copolymers (including terpolymers, etc.) having at least 60 percent recurring oxymethylene units, and further includes substituted oxymethylene polymers, wherein the substituents are inert, i.e., do not participate in undesirable side reactions.

Also, as used in the specification and claims of this application, the term "copolymer" means polymers obtained by copolymerization of two or more different monomers (i.e., polymers containing in their molecular structure two or more different monomer units), and includes terpolymers, tetrapolymers and high multicomponent polymers. The term "polymer" (unless it is clear from the context that the homopolymer or a copolymer is intended) includes within its meaning both homopolymers and copolymers.

In some cases it is especially desirable to use oxymethylene terpolymers as the oxymethylene polymer component according to this invention, e.g., in making molding compositions especially adapted for use in making blow-molded or otherwise shaped articles e.g., bottles or other types of containers. Oxymethylene terpolymers that are particularly useful in such applications, as well as for other purposes, include those disclosed in Great Britain Pat. No. 1,026,777 issued to W. E. Heinz and F. B. McAndrew on Apr. 20, 1966, assigned to the same assignee as the instant invention, and which by this cross-reference is made a part of the disclosure of the present application.

The oxymethylene polymers that are modified according to this invention are thermoplastic materials having a molecular weight of at least 5,000, a melting point of at least 100° C. and an inherent viscosity of at least 0.6 (measured at 60° C. in a 0.1 weight percent solution in p-chlorophenol containing 2 weight percent of alpha-pinene), preferably they have a molecular weight of at least 10,000, a melting point of at least 150° C. and an inherent viscosity of at least 1.0 (measured at 60° C. in a 0.1 weight percent solution in p-chlorophenol containing 2 weight percent of alpha-pinene).

The oxymethylene polymer component used in this invention may be, if desired, oxymethylene polymers that have been preliminarily stabilized to a substantial degree. Such stabilizing technique may take the form of stabilization by degradation of the molecular ends of the polymer chain to a point where a relatively stable carbon-to-carbon linkage exists at each end. For example, such degradation may be effected by hydrolysis as disclosed in Canadian Pat. No. 725,734 issued to Frank M. Berardinelli on Jan. 11, 1966, assigned to the same assignee as the present invention, and by this cross-reference is made a part of the disclosure of the instant application.

Catalysts suitable for use in polymerizing trioxane or formaldehyde alone or with other copolymerizable components in producing the oxymethylene polymers that are modified according to this invention may be widely varied. Preferred catalysts are cationic catalysts, including such inorganic fluorine-containing catalysts as boron trifluoride, antimony trifluoride, antimony fluoroborate, bismuth trifluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, phosphorous pentafluoride, hydrogen fluoride, and compounds containing these materials, such as boron fluoride coordinate complexes with organic compounds, particularly those in which oxygen or sulfur is a donor atom.

Other suitable catalysts include thionyl chloride, fluorosulfonic acid, methanesulfonic acid, phosphorous trichloride, titanium tetrachloride, ferric chloride, zirconium tetrachloride, aluminum trichloride, stannic chloride and stannous chloride.

The particularly preferred catalysts are boron fluoride and boron fluoride-containing materials, such as boron fluoride monohydrate, boron fluoride dihydrate and boron fluoride trihydrate as well as boron fluoride coordinate complexes with organic compounds as mentioned previously.

While up to as much as 100 percent of the polymeric chains of the oxymethylene polymers may contain terminal hydroxymethyl or hydroxyalkyl groups (i.e., hydroxy bonded to methylene or higher alkylene groups) the oxymethylene polymers may also contain active hydrogen-containing groups bonded to or adjacent copolymeric units derived from the comonomers described above and in the aforementioned article by Kern et al.

THE POLYBUTYLENE TEREPHTHALATE

The polybutylene terephthalate used according to this invention may be prepared by the reaction of terephthalic acid or a dialkyl ester of terephthalic acid (especially dimethyl terephthalate), with 1,4-butanediol.

The range of intrinsic viscosity of the polybutylene terephthalate, thereby produced, for use according to the instant invention should be from about 0.2 to about 1.2 deciliters per gram, with the preferred range being between from about 0.5 to about 1.0 deciliters per gram, as measured in meta-cresol.

The hydroxyl end group value for the polybutylene terephthalate should be between from about 30 to about 150 equivalents per million grams of polymer, preferably from about 50 to about 100 equivalents per million grams of polymer, and the carboxyl end group value should be between from about 10 to about 60 equivalents per million grams of polymer, preferably from about 15 to about 60 equivalents per million grams of polymer.

THE COUPLING AGENT

The coupling agents are suitably bifunctional compounds having at least one isocyano (—NCO) or isothiocyano (—NCS) group, and preferably are organic diisocyanates, (OCN—R—NCO), diisothiocyanates (SCN—R—NCS)

or isocyanateisothiocyanates (OCN—R—NCS), but may also be of higher functionality (e.g., triisocyanates, polyisocyanates, etc.).

A preferred class of coupling agents has the general formula R (—NCX)$_n$ wherein X is an atom selected from the group consisting of oxygen and sulfur, $n$ is an integer between 1–3, and R is an organic radical derived from the group consisting of aliphatic, cycloaliphatic and aromatic moieties having one to twenty carbon atoms, and substituted derivatives thereof, where the substituents are inert i.e., do not participate in undesirable side reactions.

Suitable compounds include, for example, aromatic diisocyanates, such as 2,4-toluene diisocyanate; 2,6-toluene diisocyanate; 1.6-toluene diisocyanate; diphenyl methane 4,4'-diisocyanate; 3,3'-dimethyl diphenyl methane 4,4'-diisocyanate; 3,3'-dimethyl 4,4'-diphenylene diisocyanate (3,3-bitoluene 4,4'-diisocyanate); m-phenylene diisocyanate; p-phenylene diisocyanate; o-phenylene diisocyanate; methane diisocyanate; chlorophenylene-2,4-diisocyanate; chlorophenylene 2,4-toluene diisocyanate; 3,3'-dichlorodiphenyl-4,4'-diisocyanate; 4-chloro-1,3-phenylene diisocyanate; xylene 1,4-diisocyanate; dixylylene methane 4,4'-diisocyanate; 1,5-naphthalene diisocyanate, 1,4-naphthalene diisocyanate, and the corresponding diisothiocyanates and the isocyanateisothiocyanates; alkylene diisocyanates, such as 1,6-hexamethylene diisocyanate; 1,2-ethylene diisocyanate; 1,3-propylene diisocyanate; 1,4-tetramethylene diisocyanate; 1,5-pentamethylene diisocyanate; and the corresponding diisocyanates and the isocyanate-isothiocyanates; alkylidene diisocyanates, such as ethylidene diisocyanate and propylidene diisocyanate and the corresponding diisothiocyanates and the isocyanate-isothiocyanates; cycloaliphatic diisocyanates, such as 1,3-cyclohexylene diisocyanate; 1,3-cyclopentylene diisocyanate; 1,4-cyclohexylene diisocyanate; 4,4'-methylenebis-(cyclohexyl isocyanate) and the corresponding diisothiocyanates and isocyanate-isothiocyanates; triisocyanates, such as triphenyl methane triisocyanate; 1,3,5-benzene triisocyanate, and the corresponding isothiocyanates and isocyanate-isothiocyanates. Mixtures of any of the aforementioned compounds, such as mixtures of the 2,4 and 2,6 isomers of toluene diisocyanate, may also be desirable in certain applications.

Other bifunctional coupling agents are the combinations of a biscarbamyl chloride of a diprimary diamine and a diprimary amine, and phosgene and a diprimary diamine.

The coupling reaction may be carried out in an emulsion, suspension or solution system but preferably a melt system is employed wherein all of the reactants, i.e., the oxymethylene polymer, the polybutylene terephthalate and the isocyanate or isothiocyanate are in the liquid state, i.e., in a single or double screw extruder or the like. Generally temperatures between from about 100° C. to 275° C. are employed, with the range of from about 150° C. to about 250° C. being preferred for a melt state of the preferred oxymethylene copolymers. Lower temperatures in the suitable ranges are particularly preferred, and lower or higher pressures than atmospheric may be employed, although subatmospheric pressure is preferred.

The coupling reaction medium is preferably substantially anhydrous with a water content below about 0.3 weight percent based upon the total weight of reactants, preferably below about 0.3 weight percent based upon the total weight of reactants, preferably below about 0.1 weight percent, and most preferably below from about 0.01 to about 0.04 weight percent.

The isocyanate or isothiocyanate may be provided in variable amounts but preferably it is provided in amounts between from about 0.1 to about 5 weight percent, based upon the total weight percent of reactants, most preferably from about 1.5 to about 2.5 weight percent.

The polybutylene terephthalate may be provided in amounts up to about 50 weight percent, based upon the total weight of reactants, preferably from about 1.0 to about 20 weight percent, and most preferably from about 2 to about 10 weight percent.

In producing the modified oxymethylene polymer of the instant invention by the coupling reaction of the oxymethylene polymer and the polybutylene terephthalate with the isocyanate or isothiocyanate, if desired a catalyst may be added to enhance the reaction rate of the coupling reaction. Suitable catalysts include basic substances, free of interfering active hydrogen atoms, such as alkali metals, e.g., sodium, the alkali metal alkoxide, Friedel-Craft metal halides etc., or tertiary amines including such compounds as triethylamine, tributylamine, and triethanolamine, or most preferably organic tin compounds such as dibutyltin dilaurate or stannous octoate.

The catalyst may be provided in amounts from about 0.0,005 to about 0.05 weight percent, based upon the total weight of reactants, and preferably from about 0.005 to about 0.015 weight percent.

The modified oxymethylene polymer may also contain if desired, reinforcing agents, fillers, pigments, dyes, nucleating agents, stabilizers such as phosphite materials, antioxidants, or the like.

In order that those skilled in the art may better understand how the present invention may be carried into effect the following examples are given by way of illustration and not by way of limitation.

EXAMPLE I

The oxymethylene polymer (acetal polymer) used in this example is a trioxane-ethylene oxide copolymer containing about 2 weight percent of comonomer units derived from ethylene oxide. It is prepared as previously has been broadly described herein and more specifically in the cited prior art, e.g., the afore-mentioned Walling et al. U.S. Pat. No. 3,027,352. It is in flake form, and about 70 percent of the copolymer passes through a 40-mesh screen. It has an inherent viscosity (I.V.) of about 1.2 (measured at 60° C. in 0.1 weight percent solution in p-chlorophenol containing 2 weight percent of alpha-pinene). It has a melt index of about 9.0. (The apparatus used and method of determining melt index are described in ASTM D-1238-57T).

This polymer was extruded on a 1-¾ inch Prodex vented extruder at a melt temperature of about 440° F., quenched and then pelletized and samples were prepared for physical testing on a new Britain screw injection molding machine with a melt temperature of about 400° F., an injection pressure of about 1,300 psi, and a mold temperature of about 200° F.

The physical properties of this polymer are reported in Tables I, II, and III.

EXAMPLES II — IV 96 parts by weight of the oxymethylene polymer of Example I was tumble blended with 2 parts by weight of diphenyl methane 4,4'-diisocyanate and II — 2 parts by weight of polyethylene terephthalate with an intrinsic viscosity of 0.654 deciliters per gram as measured in meta-cresol, an hydroxyl end group value of 67 equivalents per million grams of polymer, and a carboxyl end group value of 18 equivalents per million grams of polymer;

III — 2 parts by weight of polypropylene terephthalate with an intrinsic viscosity of 0.63 deciliters per gram as measured in meta-cresol, an hydroxyl end group value of 57 equivalents per million grams of polymer and a carboxyl end group value of 26 equivalents per million grams of polymer; and IV — 2 parts by weight of polybutylene terephthalate with an intrinsic viscosity of 0.739 deciliters per gram as measured in meta-cresol, an hydroxyl end group value of 83 equivalents per million grams of polymer, and a carboxyl end group value of 48 equivalents per million grams of polymer; the blends were extruded, quenched and pelletized as per Example I, and then samples prepared for physical testing as per Example I.

The physical properties of each of these compositions is recorded in Table I.

What this table describes is that the modified oxymethylene polymer prepared by the coupling reaction of an oxymethylene polymer and polybutylene terephthalate with an isocyanate, exhibits a remarkable balance of physical properties such as tensile strength, tensile modulus, flexural strength and impact strength as compared to modified oxymethylene polymers prepared from lower homologue esters of terephthalic acid such as polyethylene terephthalate and polypropylene terephthalate.

EXAMPLES V — VII

The procedure of Examples II — IV were repeated except that the compositions contained 94 parts by weight of oxymethylene polymer, 2 parts by weight of diphenyl methane 4,4'-diisocyanate and 4 parts by weight of the various polyalkylene terephthalate polyesters.

The physical properties of each of these compositions is recorded in Table II.

As in Table I this Table II describes the remarkable balance of physical properties obtained with the use of polybutylene terephthalate.

EXAMPLES VIII — IX

Several modified oxymethylene polymer compositions were prepared according to the procedure of Examples II — IV, containing;

VIII — 88 parts by weight of the oxymethylene polymer of Example I, 2 parts by weight of diphenyl methane 4,4'-diisocyanate and 10 parts by weight of the polybutylene terephthalate of Example II — IV;

IX — 78 parts by weight of the oxymethylene polymer of Example I, 2 parts by weight of diphenyl methane 4,4'-diisocyanate and 20 parts by weight of the polybutylene terephthalate of Examples II — IV.

The physical properties of each of these compositions is recorded in Table III.

As in Tables I and II, this Table III describes the remarkable balance of physical properties obtained with the use of polybutylene terephthalate.

TABLE I

| Ex. No. | Parts Oxymethylene polymer | Parts D-isocyanate | Parts Polyalkylene terephthalate | Tensile strength (psi) | Tensile Modulus (psi × 10⁵) | Flexural strength (psi) | Notched Izod Impact Strength ft.-lbs./in. notch |
|---|---|---|---|---|---|---|---|
| I | 100* | 0 | 0 | 8200 | 3.88 | 11,600 | 1.3 |
| II | 96* | 2** | 2*** | 9200 | 4.43 | 13,600 | 0.9 |
| III | 96* | 2** | 2**** | 9000 | 4.04 | 13,000 | 1.2 |
| IV | 96* | 2** | 2***** | 9100 | 4.52 | 13,600 | 1.3 |

*Oxymethylene copolymer containing 2 weight percent of ethylene oxide comonomer
**Diphenyl methane 4,4'-diisocyanate
***Polyethylene terephthalate
****Polypropylene terephthalate
*****Polybutylene terephthalate

TABLE II

| Ex. No. | Parts Oxymethylene polymer | Parts D-isocyanate | Parts Polyalkylene terephthalate | Tensile strength (psi) | Tensile Modulus (psi × 10⁵) | Flexural strength (psi) | Notched Izod Impact Strength ft.-lbs./in. notch |
|---|---|---|---|---|---|---|---|
| I | 100* | 0 | 0 | 8200 | 3.88 | 11,600 | 1.3 |
| V | 94* | 2** | 4*** | 9200 | 4.32 | 13,400 | 1.1 |
| VI | 94* | 2** | 4**** | 9000 | 4.06 | 13,000 | 1.1 |
| VII | 94* | 2** | 4***** | 9000 | 4.21 | 13,000 | 1.3 |

*Oxymethylene copolymer containing 2 weight percent of ethylene oxide comonomer
**Diphenyl methane 4,4'-diisocyanate
***Polyethylene terephthalate
****Polypropylene terephthalate
*****Polybutylene terephthalate

TABLE III

| Ex. No. | Parts Oxymethylene polymer | Parts D-isocyanate | Parts Polyalkylene terephthalate | Tensile strength (psi) | Tensile Modulus (psi × 10⁵) | Flexural strength (psi) | Notched Izod Impact Strength ft.-lbs./in. notch |
|---|---|---|---|---|---|---|---|

| I | 100* | 0 | 0 | 8200 | 3.88 | 11,600 | 1.3 |
| VIII | 88* | 2** | 10*** | 8900 | 4.24 | 13,300 | 1.4 |
| IX | 78* | 2** | 20*** | 8500 | 4.19 | 12,500 | 1.2 |

*Oxymethylene copolymer containing 2 weight percent of ethylene oxide comonomer
**Diphenyl methane 4,4'-diisocyanate
***Polybutylene terephthalate It is to be understood that the foregoing detailed description is given merely by way of illustration and that many variations may be made therein without departing from the spirit and scope of the invention.

What is claimed is:

1. A modified oxymethylene polymer having an improved balance of physical properties comprising, a normally solid oxymethylene polymer containing at least 60 mole percent of recurring oxymethylene units and having a molecular weight of at least 5,000; a melting point of at least 100° C; and an inherent viscosity of at least 0.6 (measured at 60° C in a 0.1 weight percent solution in p-chlorophenol containing 2 weight percent alpha-pinene) coupled by means of a coupling agent present in amounts between from about 0.1 to about 5 weight percent based upon the total weight of the composition defined by the formula R—(CNX)$_n$ wherein X is an atom selected from the group consisting of oxygen and sulfur, $n$ is an integer between 1-3 and R is an organic radical selected from the group consisting of divalent and trivalent aliphatic, cycloaliphatic, and aromatic moieties having 1–20 carbon atoms, and substituted inert derivatives thereof, where the substituents do not participate in undesirable side reactions, to polybutylene terephthalate having an intrinsic viscosity of from 0.2 to about 1.2 deciliters per gram as measured in metacresol, an hydroxyl end group value of between from about 30 to about 150 equivalents per million grams of polybutylene terephthalate, and a carboxyl end group value of from 10 to about 60 equivalents per million grams of polybutylene terephthalate present in amounts up to about 50 weight percent based upon the total weight of the composition.

2. The modified oxymethylene polymer of claim 1 wherein said normally solid oxymethylene polymer is an oxymethylene copolymer comprising from about 85 mole percent to 99.9 mole percent of the recurring —OCH$_2$— groups interspersed with groups of the formula:

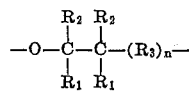

wherein each R$_1$ and R$_2$ is selected from the group consisting of hydrogen, lower alkyl and halogen-substituted lower alkyl radicals, each R$_3$ is selected from the group consisting of methylene, oxymethylene, lower alkyl and haloalkyl-substituted methylene, and lower alkyl and haloalkyl-substituted oxymethylene radicals and n is an integer from zero to three, inclusive, each lower alkyl radical having from one to two carbon atoms, inclusive, said —OCH$_2$— groups consisting from about 85 mole percent to 99.9 mole percent of the recurring units and said groups represented by the formula:

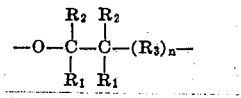

being incorporated during the step of copolymerization to produce said copolymer by the opening up of the ring of a cyclic ether having adjacent carbon atoms by the breaking of an oxygen-to-carbon linkage.

3. The modified oxymethylene polymer of claim 2 wherein said cyclic ether is represented by the formula:

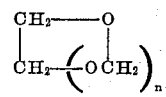

wherein $n$ represents an integer from zero to two.

4. The modified oxymethylene polymer of claim 3 wherein said coupling agent is a diisocyanate.

5. The modified oxymethylene polymer of claim 4 wherein said polybutylene terephthalate has an intrinsic viscosity of from about 0.5 to about 1.0 deciliters per gram as measured in meta-cresol, an hydroxyl end group value of from about 50 to about 100 equivalents per million grams of polybutylene terephthalate, a carboxyl end group value of between from about 15 to about 60 equivalents per million grams of polybutylene terephthalate, and is present in amounts of from about 1 to about 20 weight percent based upon the total weight of the composition.

6. The modified oxymethylene polymer of claim 5 wherein said diisocyanate is present in amounts of from about 1.5 to about 2.5 weight percent, based upon the total weight of the composition.

7. The modified oxymethylene polymer of claim 6 wherein said polybutylene terephthalate is present in amounts of from about 2 to about 10 weight percent, based upon the total weight of the composition.

8. The modified oxymethylene polymer of claim 7 wherein said diisocyanate is diphenyl methane 4,4'-diisocyanate.

9. A process for the production of modified oxymethylene polymers having an improved balance of physical properties which comprises reacting at a temperature of 100° C. - 275° C a normally solid oxymethylene polymer containing at least 60 mole percent of recurring oxymethylene units and having a molecular weight of at least 5,000; a melting point of at least 100° C; and an inherent viscosity of at least 0.6 (measured at 60° C in a 0.1 weight percent solution in p-chlorophenol containing 2 weight percent alpha-pinene); a coupling agent present in amounts between from about 0.1 to about 5 weight percent based upon the total weight of the composition defined by the formula R—(CNX)$_n$ wherein X is an atom selected from the group consisting of oxygen and sulfur, $n$ is an integer between 1-3 and R is an organic radical selected from the group consisting of divalent and trivalent aliphatic, cycloaliphatic and aromatic moieties having one to 20 carbon atoms, and substituted inert derivatives thereof, where the substituents do not participate in undesirable side reactions; and polybutylene terephthalate having an intrinsic viscosity of from 0.2 to about 1.2 deciliters per gram as measured in meta-cresol, an hydroxyl end group value of between from about 30 to about 150 equivalents per million grams of polybutylene terephthalate, and a carboxyl end group value of from 10 to about 60 equivalents per million grams of polybutylene terephthalate present in amounts up to about 50 weight percent based upon the total weight of the composition.

10. The process of claim 9 wherein said normally solid oxymethylene polymer is an oxymethylene copolymer comprising from about 85 mole percent to 99.9 mole percent recurring —$OCH_2$— groups interspersed with groups of the formula:

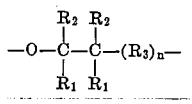

wherein each $R_1$ and $R_2$ is selected from the group consisting of hydrogen, lower alkyl and halogen-substituted lower alkyl radicals, each $R_3$ is selected from the group consisting of methylene, oxymethylene, lower alkyl and haloalkyl-substituted methylene, and lower alkyl and haloalkyl-substituted oxymethylene radicals and n is an integer from zero to three, inclusive, each lower alkyl radical having from one to two carbon atoms, inclusive, said —$OCH_2$— groups consisting from about 85 mole percent to 99.9 mole percent of the recurring units and said groups represented by the formula:

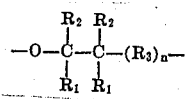

being incorporated during the step of copolymerization to produce said copolymer by the opening up of the ring of a cyclic ether having adjacent carbon atoms by the breaking of an oxygen-to-carbon linkage.

11. The process of claim 10 wherein said cyclic ether is represented by the formula:

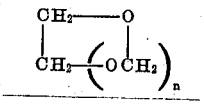

wherein n represents an integer from zero to two.

12. The process of claim 11 wherein said coupling agent is a diisocyanate.

13. The process of claim 12 wherein said polybutylene terephthalate has an intrinsic viscosity of from about 0.5 to about 10 deciliters per gram as measured in meta-cresol, an hydroxyl end group value of from about 50 to about 100 equivalents per million grams of polybutylene terephthalate, a carboxyl end group value of between from about 15 to about 60 equivalents per million grams of polybutylene terephthalate and is present in amounts of from about 1 to about 20 weight percent based upon the total weight of the compositions.

14. The process of claim 13 wherein said diisocyanate is present in amounts of from about 1.5 to about 2.5 weight percent, based upon the total weight of the composition.

15. The process of claim 14 wherein said polybutylene terephthalate is present in amounts from about 2 to about 10 weight percent, based upon the total weight of the composition.

16. The process of claim 15 wherein said diisocyanate is diphenyl methane 4,4'-diisocyanate.

* * * * *